Aug. 10, 1954 M. CAMRAS 2,686,230

MAGNETIC RECORDER WITH PRESSURE SHOE FOR RECORD MEMBERS

Filed Jan. 16, 1952

Inventor
Marvin Camras by Hill, Sherman, Meroni, Gross & Simpson
Attys

Patented Aug. 10, 1954 2,686,230

UNITED STATES PATENT OFFICE 2,686,230

MAGNETIC RECORDER WITH PRESSURE SHOE FOR RECORD MEMBERS

Marvin Camras, Chicago, Ill., assignor to Armour Research Foundation of Illinois Institute of Technology, Chicago, Ill., a corporation of Illinois Application January 16, 1952, Serial No. 266,675

4 Claims. (Cl. 179—100.2)

This invention relates to a magnetic recorder and, more particularly, to a magnetic recorder having a pressure shoe for the magnetic record member.

In one method of magnetic recording a lengthy magnetizable record medium is drawn across an electromagnetic transducer head assembly at substantially uniform linear velocity. The head assembly includes a magnetic core member having a non-magnetic gap over which the medium passes, and which is provided with suitable current conducting exciting elements to produce a magnetic field across the gap.

During the recording operation, current is caused to flow in exciting elements in accordance with time variations of an intelligence to produce a time varying magnetic field in the core in accordance with the value thereof. The lengthy magnetizable medium is subjected to the influence of this field as it is drawn therethrough and magnetization is imparted to incremental lengths of the medium in accordance with the time variations of the intelligence, thus causing variations in the magnetization of the medium along its length in accordance with the time variations of the intelligence.

During reproduction, the lengthy magnetizable medium is drawn across the same or a similar head assembly to set up a flux in the core portion thereof in accordance with the magnetization of the medium along successive incremental lengths thereof as it passes across the gap of the magnetic core member. The resultant time varying flux induces voltage in the coil with which the flux is linked in accordance with the time rate of change thereof. This voltage may be amplified and suitably reproduced by a loudspeaker or similar device to produce the intelligence recorded.

This magnetic recording and reproducing inherently involves the conversion of an intelligence to a time varying magnetic field during the recording operation and the conversion of a time varying magnetic flux to an intelligence in the reproducing operation. It will therefore be apparent to those skilled in the art that it is extremely important that the lengthy medium or magnetic record member shall always be positioned at exactly the same place with respect to the electromagnetic transducer head each time that the record member is passed over the head.

It has been found to be particularly important to use some means for closely confining the record member to the head when the record member is in the form of a paper tape having a magnetic track thereon or in the form of a plastic film having a magnetic track thereon.

This invention is a division of my copending application Serial No. 790,418, entitled "Magnetic Recorder With Pressure Shoe for Record Member," filed December 8, 1947 and assigned to the same assignee as the present invention.

One of the principal features and objects of the present invention is to provide a novel pressure shoe structure which will conform to irregularities in the head or in the record member itself so that the record member, such, for example, has a paper tape having a coating of magnetizable material thereon will be caused to closely ride against the electromagnetic transducer head as it passes thereacross, not only in the region of the non-magnetic gap, but against the pole portions on either side of the gap.

A further object of the present invention is to provide a novel method and means for constantly maintaining a lengthy magnetic record member in continual close abutting contact with the pole of an electromagnetic transducer head irrespective of irregularities in the surface of the pole or in the record member itself.

Another and further object of the present invention is to provide a pressure shoe for magnetic recorders of novel construction.

Other objects and features which I believe to be characteristic of my invention are set forth with particularity in the appended claims. My invention itself, however, both as to its organization, manner of construction and method of operation, together with further objects and advantages thereof may best be understood by reference to the following description taken in connection with the accompanying drawing, in which:

Figure 1:
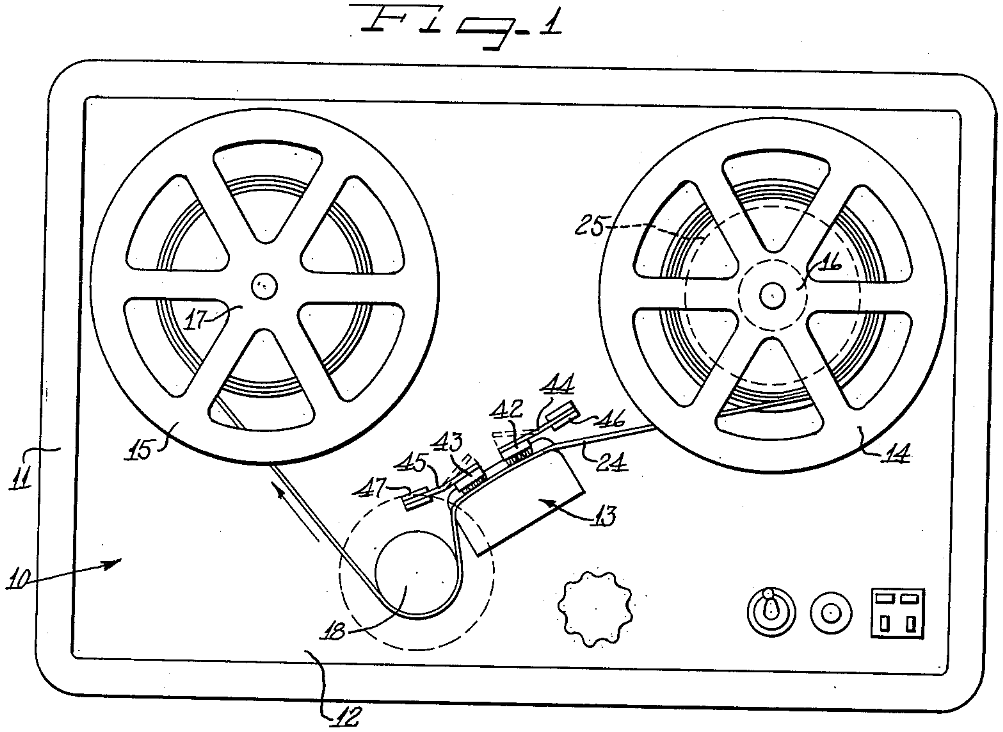
Figure 1 is a plan view of a magnetic recorder embodying the novel teachings and principles of the present invention.

As the term "magnetic recorder" is used herein, it refers either to magnetic recording apparatus, magnetic reproducing apparatus or apparatus for both magnetic recording and magnetic reproducing. Furthermore, as the term "electromagnetic transducer head" is used herein, it refers to a head for converting a time varying electric current into a time varying magnetic field through which a magnetizable record member is passed, or to a head for converting a time varying magnetic field to a time varying electric current, or to an erase head in which an alternating current is converted into an alternating magnetic field which demagnetizes the magnetic record member.

The novel pressure shoes of the present invention may, of course, be employed on a wide variety of magnetic recorders without departing from the spirit and scope of the present invention. They have been shown in Figure 1 of the drawings as being mounted on a magnetic recorder of the dual channel one-way drive type. This recorder, generally designated as 10, includes a housing 11 which houses the drive mechanism and amplifying equipment (not shown). The housing 11 is closed off at the top by top panel 12 on which an electromagnetic transducer head assembly 13, the supply reel 14 and take-up reel 15 are mounted. The reels 14 and 15 are mounted on spindles 16 and 17, respectively. Also mounted on the panel 12 is a capstan drive roller 18 which is arranged to be driven at a uniform angular velocity from a motor drive shaft 19 through drive rollers 20 and 21, the latter being mounted and secured to the capstan shaft 22.

The take-up reel 15 is driven through a belt drive 23 from the motor drive shaft 19. Through this drive mechanism a magnetic record member 24 such, for example, as a paper tape having a coating of magnetizable material thereon is transferred from the supply reel 14 to the take-up reel 15. The magnetic record member 24, in traveling from the supply reel 14 to the take-up reel 15, crosses the electromagnetic transducer head assembly 13 and then over the capstan drive roll 18. The drive connection between the motor drive shaft 19 and the take-up reel 15 is arranged to slip as is necessary in constant drive types of magnetic recorders since the take-up reel must be driven at a speed which tends to try to take up the magnetic record member faster than the capstan causes it to travel.

The supply reel 14 preferably is provided with a friction brake disk 25 which maintains the magnetic record member 24 taut over the head assembly 13.

Figure 2:
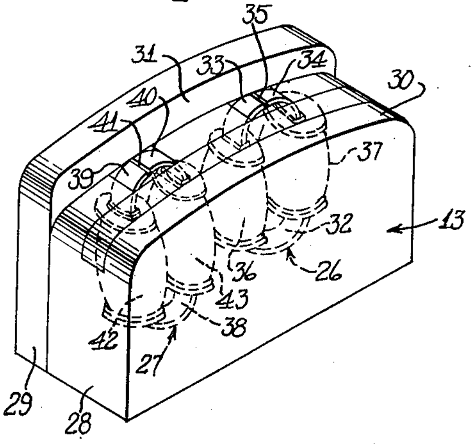
Figure 2 is an isometric view of an electromagnetic transducer head and erase head assembly as used on the magnetic recorder illustrated in Figure 1.

The head assembly 13 may be understood best from an inspection of Figure 2 of the drawing. This electromagnetic transducer head assembly 13 includes an erase head 26 and a record play-back head 27 which are mounted in a plastic housing 28 having a back wall portion 29 which extends somewhat beyond the curved surface 30 of the housing 28 to provide a flange portion 31 against which the edge of the record member 24 is seated as it passes over the electromagnetic transducer head assembly 13. The erase head 26 includes a core portion 32 having a pair of confronting polar portions 33 and 34. The pole portions 33 and 34 are slightly spaced to form a non-magnetic gap 35. A pair of coils 36 and 37 are mounted on the core 32 and are electrically connected and wound to be in aiding relation to each other in setting up a magnetic flux in the core 32. The record play-back head 27 is similarly constructed and includes a core 38 having confronting pole portions 39 and 40 with a non-magnetic gap 41 between the ends of the latter. Signal coils 42 and 43 are mounted on the core 38 in a similar manner to the coils 36 and 37 of the erase head 26. As is the usual practice, the non-magnetic gap 41 in the record play-back head 27 is substantially smaller than the erase gap 35 in the erase head 26.

As shown, the pole portions 33 and 34 of the erase head 26 and the pole portions 39 and 40 of the record play-back head 27 cover slightly less than one-half of the width of the tape record member 24. The tape record member is thus arranged to have two records thereon lying side by side, one extending in one direction and the other extending in the opposite direction. Thus after the record member has been transferred from the supply reel 14 to the take-up reel 15, the two reels may be interchanged and turned upside down, thus placing the other half of the record member in operative engagement with the poles 33 and 34 and the poles 39 and 40. In this second operation, the reel 14 which was originally the supply reel now becomes the take-up reel, and the reel 15 which was originally the take-up reel is now the supply reel. After the record has been played so as to reproduce the other half of the width of the record, the record is in its original condition. This eliminates the necessity of rewinding.

In the embodiment of the present invention illustrated in Figure 1, two pressure shoes 42 and 43 are provided for holding the magnetic tape record member 24 against the heads 26 and 27 of the electromagnetic transducer head assembly 13. These heads 42 and 43 are mounted on leaf springs 44 and 45 which, in turn, are secured in mounting posts 46 and 47, respectively. The two pressure shoes are similar in construction so, for purposes of simplicity, only one of the shoes, namely 42, is illustrated in detail in Figures 3 and 4 of the drawing.

Figure 3:
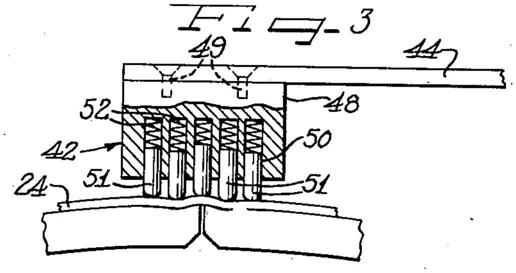
Figure 3 is a fragmentary enlarged view of a pressure shoe embodying the novel features of the present invention.

As shown in Figures 2 and 3, the pressure shoe includes a block 48 which is secured to the end of the leaf spring 44 by any suitable means such as screws 49. The block 48 is provided with a plurality of wells or recesses 50 in which are disposed plungers or fingers 51 which are spring-pressed outwardly by suitable springs 52. Any suitable means (not shown) may be provided for limiting the outward movement of the fingers 51 so that they will not fly out of the block 48 when the pressure shoe is flexed back away from the head against which the shoe presses the magnetic tape 24.

The fingers present a large number of relatively small pressure points constantly urging the magnetic record member 24 against the poles of the head structure and against the non-magnetic gap. These small pressure points define a face in engagement with the magnetic record member 24. These individually acting pressure points thus cause all of the tape to be retained in close contact with the poles of the head structure as the record member passes over the poles and over the non-magnetic gap lying therebetween. It has been found in the practice that this is greatly superior to a single pressure shoe of rigid material which is resiliently urged against the record member, such, for example, as that shown in applicant's prior United States Letters Patent No. 2,351,007 for "Magnetic Recording Head," granted June 13, 1944.

Figure 4:
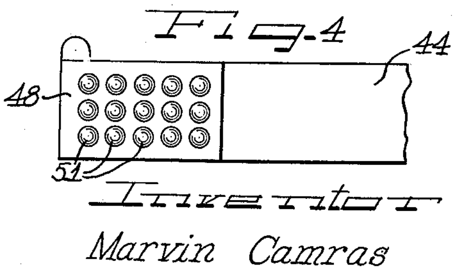
Figure 4 is a fragmentary bottom view of the pressure shoe shown in Figure 3.

In the illustrated embodiment of the present invention as specifically shown in Figures 3 and 4 of the drawing, it is preferable that one transverse row of pressure fingers be located directly over the gap 35 of the head 26, in addition to fingers pressing the tape against the pole portions on either side of the gap.

It will, of course, be understood that a similar pressure shoe is provided over the record playback head. It is further desirable that the ends of the fingers 51 be rounded so as not to damage the tape record member 24 as it passes thereunder.

It will be apparent to those skilled in the art that the upstanding posts 46 and 47 may be constructed for manual rotation when it is desired to retract the pressure shoes out of engagement with the medium. Moreover, rotation of these posts permits adjustment of the spring pressure on the shoes and hence the total force exerted on the pressure pads.

While I have shown certain particular embodiments of my invention, it will, of course, be understood that I do not wish to be limited thereto since many modifications may be made, and I, therefore, contemplate by the appended claims to cover all such modifications as fall within the true spirit and scope of my invention.

I claim as my invention:

1. An electromagnetic transducer head assembly comprising a core having a pair of confronting pole pieces and a non-magnetic gap between their extremities, said confronting pole pieces each having a surface portion over which a magnetic record member is arranged to successively pass, a shoe mounted opposite said pole pieces and having a record member-engaging portion positioned to engage a record member over both of said pole pieces and over said gap, said record member-engaging portion being formed of a plurality of elements individually mounted in said shoe for movement toward and away from said core, means for resiliently urging said elements toward said core, and means for urging said shoe toward said pole pieces and said non-magnetic gap, whereby said elements resiliently and positively press a record member against said core over both of said pole pieces and said gap.

2. An electromagnetic transducer head assembly comprising a core having a pair of confronting pole pieces and a non-magnetic gap between their extremities, said confronting pole pieces each having a surface portion over which a magnetic record member is arranged to successively pass, a shoe mounted opposite said pole pieces and having a record member-engaging portion positioned to engage a record member over both of said pole pieces and over said gap, said shoe including a plurality of elements individually mounted in said shoe for movement toward and away from said core, means for resiliently urging said elements toward said core, at least one of said elements being positioned to bear against said record member directly over said gap and at least one element for each of said pole pieces positioned to bear against said record member over each of said pole pieces, respectively, and means for urging said shoe toward said pole pieces and said non-magnetic gap, whereby said elements resiliently and positively press a record member against said core over both of said pole pieces and said gap.

3. An electromagnetic transducer head assembly comprising a core having a pair of confronting pole pieces and a non-magnetic gap between their extremities, said confronting pole pieces each having a surface portion over which a magnetic record member is arranged to successively pass, a shoe mounted opposite said pole pieces and having a record member-engaging portion positioned to engage a record member over both of said pole pieces and over said gap, said shoe having a plurality of recesses, said record member-engaging portion being formed of a plurality of plunger elements individually mounted in said recesses for reciprocal movement in said recesses toward and away from said core, means for resiliently urging said elements toward said core, and means for urging said shoe toward said pole pieces and said non-magnetic gap, whereby said elements resiliently and positively press a record member against said core over both of said pole pieces and said gap.

4. An electromagnetic transducer head assembly comprising a core having a pair of pole pieces and a non-magnetic gap between their extremities, said pole pieces each having a surface portion over which a magnetic record member is arranged to successively pass, a shoe mounted opposite said pole pieces and having a record member-engaging portion positioned to engage a record member over both of said pole pieces and over said gap, said shoe having a plurality of recesses, said record member-engaging portion being formed of a plurality of finger elements individually reciprocably mounted in said recesses for movement toward and away from said core, spring means in said recesses for resiliently urging said elements toward said core, and means for urging said shoe toward said pole pieces and said non-magnetic gap, whereby said elements resiliently and positively press a record member against said core over both of said pole pieces and said gap.

References Cited in the file of this patent

UNITED STATES PATENTS

| Number | Name | Date |
|---|---|---|
| 2,603,721 | Camras | July 15, 1952 |

FOREIGN PATENTS

| Number | Country | Date |
|---|---|---|
| 658,509 | Germany | Apr. 8, 1935 |